(12) United States Patent
Miyazaki et al.

(10) Patent No.: US 10,350,701 B2
(45) Date of Patent: Jul. 16, 2019

(54) METHOD OF SPOT WELDING

(71) Applicant: NIPPON STEEL & SUMITOMO METAL CORPORATION, Tokyo (JP)

(72) Inventors: Yasunobu Miyazaki, Tokyo (JP); Fuminori Watanabe, Tokyo (JP); Chisato Wakabayashi, Tokyo (JP); Kunio Hayashi, Tokyo (JP); Hiroyuki Kawata, Tokyo (JP); Seiji Furusako, Tokyo (JP); Sho Matsui, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 15/563,489

(22) PCT Filed: Mar. 30, 2016

(86) PCT No.: PCT/JP2016/060541
§ 371 (c)(1),
(2) Date: Sep. 29, 2017

(87) PCT Pub. No.: WO2016/159169
PCT Pub. Date: Oct. 6, 2016

(65) Prior Publication Data
US 2018/0079026 A1 Mar. 22, 2018

(30) Foreign Application Priority Data

Mar. 30, 2015 (JP) ................. 2015-069553
Feb. 8, 2016 (JP) ................. 2016-022066
Mar. 11, 2016 (JP) ................. 2016-048893

(51) Int. Cl.
*B23K 11/34* (2006.01)
*B23K 11/11* (2006.01)
(Continued)

(52) U.S. Cl.
CPC .............. *B23K 11/34* (2013.01); *B23K 11/11* (2013.01); *B23K 11/115* (2013.01); *B23K 11/16* (2013.01);
(Continued)

(58) Field of Classification Search
CPC ..... B23K 11/16; B23K 11/163; B23K 11/166; B23K 11/11; B23K 11/115; B23K 11/34;
(Continued)

(56) References Cited

U.S. PATENT DOCUMENTS 3,798,406 A * 3/1974 Becker ................. B23K 11/166
219/92
5,047,608 A * 9/1991 Takahashi ............. B23K 11/115
219/119
(Continued)

FOREIGN PATENT DOCUMENTS

JP 55-036051 A * 3/1980
JP 55-139190 A 10/1980
(Continued)

OTHER PUBLICATIONS

Machine translation of Japan Patent document No. 6-198,455, Feb. 2018.*
(Continued)

*Primary Examiner* — Geoffrey S Evans
(74) *Attorney, Agent, or Firm* — Birch, Stewart, Kolasch & Birch, LLP

(57) ABSTRACT

A spot welding method able to simply prevent liquid metal embrittlement cracks in spot welding of plated steel sheets, comprising, before spot welding, removing the plating at least in a zone including the inside of a circle centered at a scheduled location where the center of the nugget is formed and having an outer circumference of the inside of the outer edge of a weld affected zone or a zone at the mated surfaces
(Continued)

of the steel sheets to be welded at the inside of a circle sharing a center of a scheduled location becoming the center of the nugget formed at the mated surfaces of the steel sheets and having an outer circumference of the inside of the outer edge of a weld affected zone.

16 Claims, 8 Drawing Sheets

(51) Int. Cl.
*B23K 11/16* (2006.01)
*B23K 26/36* (2014.01)
B23K 101/34 (2006.01)

(52) U.S. Cl.
CPC .......... *B23K 11/163* (2013.01); *B23K 11/166* (2013.01); *B23K 26/36* (2013.01); *B23K 2101/34* (2018.08)

(58) Field of Classification Search
CPC ... B23K 26/36; B23K 26/362; B23K 2101/34
See application file for complete search history.

(56) References Cited

U.S. PATENT DOCUMENTS

| | | | |
|---|---|---|---|
| 2011/0236632 A1* | 9/2011 | Hosokawa | B05D 5/063 428/141 |
| 2012/0129006 A1* | 5/2012 | Kanai | B23K 11/115 428/683 |
| 2015/0217396 A1* | 8/2015 | Okada | B23K 11/115 403/271 |
| 2016/0008913 A1 | 1/2016 | Okita et al. | |
| 2016/0059343 A1 | 3/2016 | Nam et al. | |
| 2016/0144450 A1* | 5/2016 | Murakami | C22C 38/04 403/271 |
| 2016/0355902 A1* | 12/2016 | Yang | B23K 26/32 |

FOREIGN PATENT DOCUMENTS

| | | | |
|---|---|---|---|
| JP | 63-43775 A | | 2/1988 |
| JP | 5-277552 A | | 10/1993 |
| JP | 6-198455 A | * | 7/1994 |
| JP | 10-143212 A | | 5/1998 |
| JP | 2003-89881 A | | 3/2003 |
| JP | 2004-188495 A | | 7/2004 |
| JP | 2005-88029 A | | 4/2005 |
| JP | 2006-265671 A | | 10/2006 |
| JP | 2008-231493 A | | 10/2008 |
| JP | 2011-218423 A | | 11/2011 |
| JP | 2013-63460 A | | 4/2013 |
| KR | 1999-013789 U | | 4/1999 |
| WO | WO 2014/136507 A1 | | 4/1999 |
| WO | WO 2014/185574 A1 | | 11/2014 |

OTHER PUBLICATIONS

International Search Report for PCT/JP2016/060541 (PCT/ISA/210) dated Jun. 14, 2016.
Written Opinion of the International Searching Authority for PCT/JP2016/060541 (PCT/ISA/237) dated Jun. 14, 2016.
Chinese Office Action and Search Report, dated Jul. 24, 2018, for Chinese Application No. 201680020469.9, along with an English translation of the Chinese Office Action.
Zhang et al., "Nucleation mechanism of spot welding galvanized steel sheet," Journal of Nanchang Institute of Technology, vol. 26, No. 3, Jun. 30, 2007, pp. 31-34.

* cited by examiner

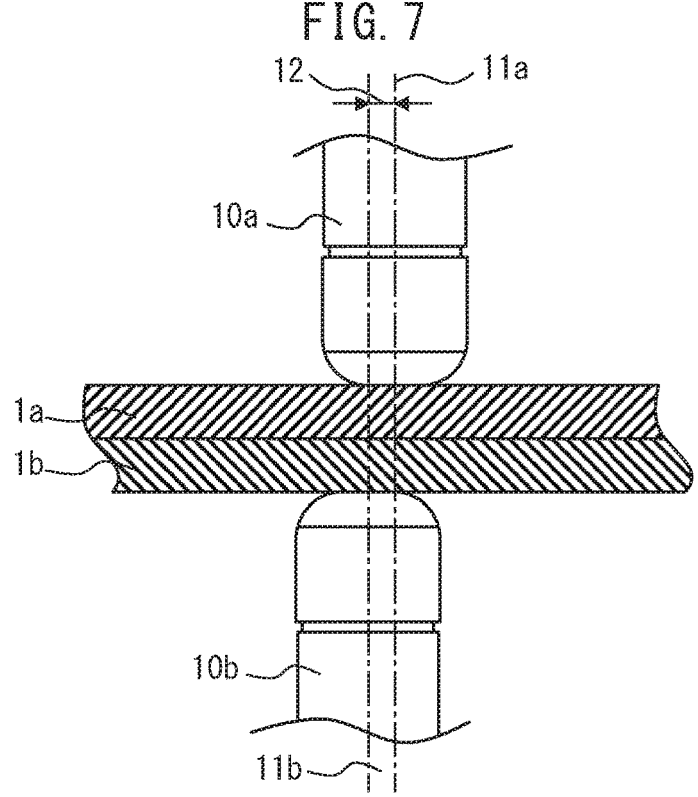
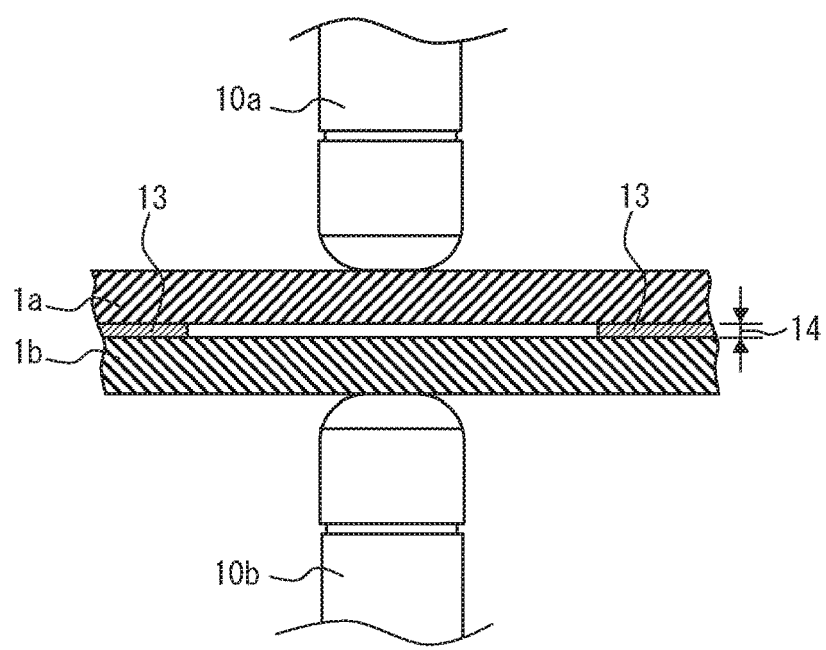

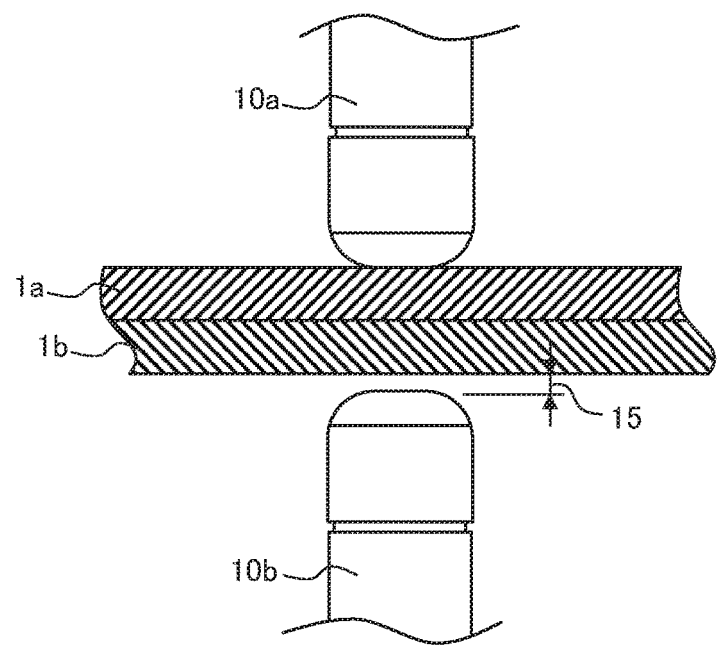
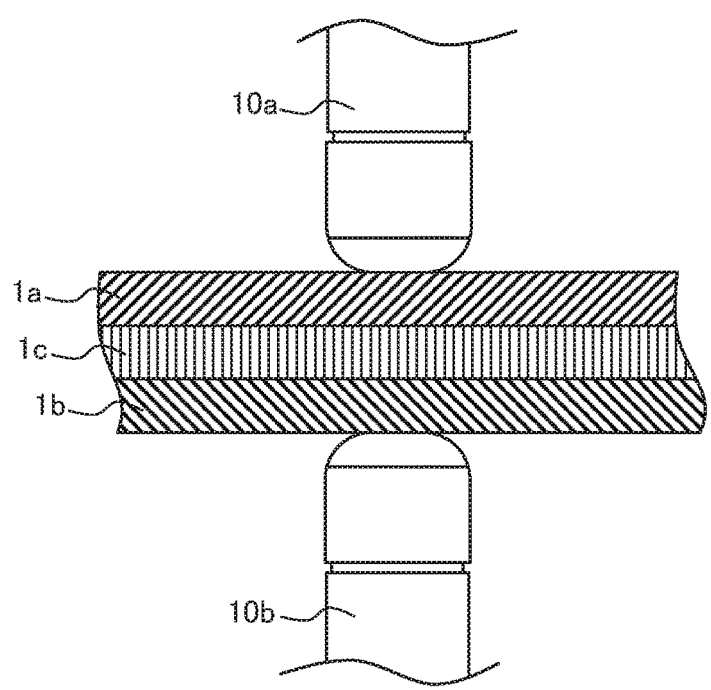

METHOD OF SPOT WELDING

TECHNICAL FIELD

The present invention relates to a spot welding method for a plurality of steel sheets including a plated steel sheet, more particularly relates to a spot welding method suitable for a plurality of steel sheets including a galvanized high strength steel sheet for automobile use.

BACKGROUND ART

In recent years, in the automotive field, in order to improve fuel economy and slash $CO_2$ emissions, reduction of the weight of the vehicle body has been demanded. To improve crash safety, increasing the strength of the members of the car body has also been demanded. In order to satisfy these demands, it is effective to use high strength steel sheet for members of the vehicle body and various parts.

Further, from the viewpoint of increasing rust prevention of the car body, it is necessary to construct members from steel sheets excellent in corrosion resistance. It is widely known that galvanized steel sheets have good corrosion resistance. From the viewpoint of reducing the weight and raising the strength, in galvanized steel sheets used for automobiles, galvanized high strength steel sheets using high strength steel sheets for the plated sheets are being used.

In the assembly of automobile bodies and attachment of parts etc., spot welding is mainly used. If spot welding galvanized high strength steel sheets, cracking may occur in the sheet thickness direction from the outer surfaces of the steel sheets in contact with the electrodes for spot welding use.

FIG. 1 shows an outline of cracking in a spot welded location when spot welding galvanized high strength steel sheets. FIG. 1 is a cross-section in the sheet thickness direction. When spot welding galvanized high strength steel sheets 1, it is known that cracking 3 advancing from a surface of a steel sheet 1 in contact with an electrode toward the melted and solidified part 2 (nugget) (below, referred to as "cracking right below an electrode"), cracking 5 advancing from a portion of a steel sheet 1 in contact with a shoulder portion of an electrode to a heat affected zone 4 (below, referred to as "cracking at a shoulder"), and cracking 6 advancing from an outside of a portion where an electrode and a steel sheet 1 come into contact to a heat affected zone 4 (below, referred to as "cracking outside of an electrode") occur.

Below, when it is not particularly necessary to differentiate them, "cracking right below an electrode", "cracking at a shoulder", and "cracking outside of an electrode" will be collectively referred to as "external cracking". Further, "cracking at a shoulder" and "cracking outside of an electrode" will be collectively referred to as "cracking near an outer circumference of a weld".

Such cracking is said to be cracking due to so-called "liquid metal embrittlement". That is, it is said that by applying the electrode pressing force and the tensile stress due to thermal expansion and contraction of the steel sheets to the weld zone, the molten galvanized metal invades the grain boundaries of the steel sheets and decreases the intergranular strength.

In automobile bodies, if the cracking in a welded location is remarkable, the strength of the joint decreases. There are known techniques for suppressing cracking at a welded location by methods of controlling the chemical composition and structure of the steel sheets.

For example, PLT 1 discloses to adjust the chemical composition of the steel sheets, render the austenite phase generated during the spot welding to fine crystal grains, and complicatedly interpose them with crystal grains of other phases in the metal structure so as to thereby make the paths for diffusion and penetration of molten zinc to the crystal grain boundaries complicated and make it difficult for molten zinc to penetrate and thus prevent liquid metal embrittlement cracking at the time of welding.

Further, PLT 2 teaches that by merely making the crystal grain boundaries more complicated by controlling the structures of the steel sheets, it is not possible to sufficiently suppress the occurrence of cracking at a welded location. It discloses to adjust the chemical compositions of the steel sheets, make the intergranular penetration depths of the hot rolled steel sheets 5 µm or less, and electroplate by Fe cold rolled steel sheets before hot dip galvannealing so as to make the intergranular penetration depths of the hot dip galvannealed steel sheets 5 µm or less and thereby suppress the occurrence of cracking at a welded location of the hot dip galvannealed steel sheets.

CITED REFERENCE LIST

Patent Literature

PLT 1: Japanese Patent Publication No. 2006-265671A
PLT 2: Japanese Patent Publication No. 2008-231493A
PLT 3: Japanese Patent Publication No. 05-277552A

SUMMARY OF INVENTION

Technical Problem

In this way, countermeasures against cracking at contact locations between steel sheets and electrodes are being studied. However, in spot welded joints of some galvanized steel sheets or in some spot welded joints of some non-plated steel sheets and galvanized steel sheets, cracking still occurs at contact locations between steel sheets and electrodes and, even when cracking does not occur, the desired tensile strength sometimes cannot be obtained.

The present inventors investigated the reason why a desired tensile strength cannot be obtained in a case where cracking at contact locations between steel sheets and electrodes does not occur. FIG. 2 and FIG. 3 are schematic outlines of cracking at a spot welded location and show a cross-section in the sheet thickness direction including the nugget.

As shown in FIG. 2, in a spot welded joint in which the desired tensile strength cannot be obtained, sometimes cracking 7 occurred right outside the corona bond at the mated surfaces of the steel sheets and cracking 8 occurred at the nugget boundary of the corona bond.

Further, as shown in FIG. 3, in a spot welded joint of three or more steel sheets where the desired tensile strength cannot be obtained, sometimes cracking 9 inside the nugget advancing from the corona bond into the nugget occurred.

Below, when it is not particularly necessary to differentiate them, "cracking right outside a corona bond", "cracking at a nugget boundary of the corona bond", and "cracking inside of a nugget" will be collectively referred to as "internal cracking".

Such cracking at the mated surfaces of the steel sheets and cracking of contact locations between steel sheets and electrodes do not always occur when spot welding galvanized high strength steel sheets. Therefore, in the case where the cracking occurs, it is desired to prevent cracking by a simple method.

In view of such circumstances, the present invention has as its object to provide a spot welding method which can easily prevent liquid metal embrittlement cracking in spot welding of plated steel sheets.

Solution to Problem

The present inventors investigated the relationship of welded locations with factors causing liquid metal embrittlement cracking whereupon they found that cracking easily occurs in the following cases (a) to (g):

(a) the case of welding given an angle whereby the axial center becomes 3° or more from perpendicular to the surface of a steel sheet, (b) the case of welding using an angled electrode with an axial center of a welding electrode of 5° or more from perpendicular to the surface of a steel sheet, (c) the case of welding using a welding gun with an axial center of an electrode bent 3° or more from perpendicular to the surface of a steel sheet during welding, (d) the case of welding in a state with a relative misalignment of the axial centers of facing welding electrodes of 0.5 mm or more, (e) the case of welding a welded location with a gap between mated surfaces of 0.5 mm or more, (f) the case of welding in the state with the position of the fixed side welding electrode from a steel sheet in the pressing direction having a clearance of 0.2 mm or more, and (g) the case of welding sheets combination including steel sheets with a strength ratio of over 2.5.

The present inventors thought that, in such a case, in the welding process, there is a location where the tensile stress becomes high at the position of cracking and the molten plating metal invades the crystal grain boundaries of the steel sheets at that location and thereby causes cracking.

The present inventors examined means for preventing liquid metal embrittlement cracking. As a result, they came up with the idea of removing at least the plating covered at a region of the inside of a welding heat affected zone at a surface at a side contacting an electrode before actual spot welding to thereby prevent external cracking or of removing at least the plating covered at both sides of the mated surfaces of the steel sheets at a ring-shaped region with an outer circumference of the outer edge of the heat affected zone and with an inner circumferences of a range of 0.8 time the nugget diameter to thereby prevent internal cracking at the mated surfaces of the steel sheets and thereby completed the invention.

The present invention was made based on the above findings and has as its gist the following:

(1) A method of spot welding of a stacked plurality of steel sheets, one or more of the stacked plurality of steel sheets having a welding part coated with plating on at least one surface, the method comprising: removing the plating from a range at least having in-circle area, an outer edge of the area being an outer periphery of a weld heat affected zone formed at the surfaces of the welding electrode side of the stacked plurality of steel sheets, clamping the stacked plurality of steel sheets with welding electrodes facing the steel sheets, and spot welding the stacked plurality of steel sheets.

(2) The method of a spot welding according to (1), further comprising, after spot welding, coating by a sealer part or all of the part from which the plating has been removed.

(3) The method of a spot welding according to (1) or (2), further comprising test spot welding before removing the plating, confirming any occurrence of cracking in the welded part, and, when confirming cracking of the welding electrode sides of the stacked plurality of steel sheets, removing the plating at the surfaces of the steel sheets where cracking was confirmed.

(4) A method of spot welding of a stacked plurality of steel sheets, one or more of the stacked plurality of steel sheets having a welding part coated with plating on at least one surface, the method comprising: removing the plating from an in-circle area, an outer edge of the area being an outer periphery of a broadest weld heat affected zone formed at mated surfaces of the stacked plurality of steel sheets, clamping the stacked plurality of steel sheets with welding electrodes facing the steel sheets, and spot welding the stacked plurality of steel sheets.

(5) A method of spot welding of a stacked plurality of steel sheets, one or more of the stacked plurality of steel sheets having a welding part coated with plating on at least one surface, the method comprising: removing the plating from a circular ring area, an outer edge of the area being an outer periphery of a broadest weld heat affected zone formed at mated surfaces of the stacked plurality of steel sheets, an inner edge of the area being a circle sharing a center of a scheduled position becoming a center of a nugget formed at the mated surfaces of the steel sheets and having a diameter of 0.8 time the diameter of the nugget; clamping the stacked plurality of steel sheets with welding electrodes facing the steel sheets; and spot welding the stacked plurality of steel sheets.

(6) The method of a spot welding according to (4) or (5), further comprising, before spot welding, coating by a sealer or adhesive part or all of the part from which the plating has been removed.

(7) The method of a spot welding according to any one of (4) to (6), further comprising test spot welding before removing the plating, confirming any occurrence of cracking in the welded part, and, when confirming cracking of the stacked plurality of steel sheets, removing the plating at the cracked surfaces of the steel sheets where cracking was confirmed and the mated surfaces of the stacked steel sheets.

(8) The method of a spot welding according to claim (3) or (7) further comprising test spot welding when the spot welding is performed under conditions including at least one of (a) the case of welding with an angle of the axial center of a welding electrode of 3° or more from perpendicular to the surface of a steel sheet, (b) the case of welding using an angled electrode with an axial center of a welding electrode of 5° or more from perpendicular to the surface of a steel sheet, (c) the case of welding using a welding gun with an axial center of an electrode bent 3° or more from perpendicular to the surface of a steel sheet during welding, (d) the case of welding in a state with a relative misalignment of the axial centers of facing welding electrodes of 0.5 mm or more, (e) the case of welding a welding part with a gap between mated surfaces of 0.5 mm or more, (f) the case of welding in the state with the position of the fixed side welding electrode from a steel sheet in the pressing direction having a clearance of 0.2 mm or more, and (g) the case of welding sheets combination including steel sheets with a strength ratio of over 2.5.

(9) The method of a spot welding according to (3), (7), or (8), further comprising removing the plating of the steel sheets where no cracking was confirmed at the test spot welding.

(10) The method of a spot welding according to any one of (1) to (9), wherein the plating is removed by at least one of mechanical removal and removal by evaporation.

(11) The method of a spot welding according to any one of (1) to (10), wherein the plating is galvanized plating.

Advantageous Effect of Invention

According to the present invention, in the spot welding, occurrence of liquid metal embrittlement cracking can be easily prevented.

BRIEF DESCRIPTION OF DRAWINGS

FIG. 7 is a cross-sectional view in the sheet thickness direction showing a state of welding while relative misalignment of axial centers of facing welding electrodes occurs.

FIG. 8 is a cross-sectional view in a sheet thickness direction showing a state of welding a welded location having a gap at mated surfaces.

FIG. 9 is a cross-sectional view in a sheet thickness direction showing a state of welding with inappropriate positions of pressing directions of welding electrodes with respect to a plurality of steel sheets.

FIG. 10 is a cross-sectional view showing a state of welding three superposed sheets combination.

DESCRIPTION OF EMBODIMENTS

The spot welding method of the present invention (below, referred to as the "welding method of the present invention") is a method of removing the plating before spot welding when it is predicted that cracking will occur at a welded location before spot welding a plurality of steel sheets including one or more steel sheets covered with plating at a welded location on one surface.

The occurrence of cracking can be confirmed by test spot welding a plurality of steel sheets including at least one sheet covered with plating to be actually spot welded.

Particularly, when the spot welding is performed under conditions that satisfy one or more of conditions of the following (a) to (g), it is preferable to perform test spot welding with the same sheets combination before actually spot welding and starting production.

(a) the case of welding with an angle of the axial center of a welding electrode of 3° or more from perpendicular to the surface of a steel sheet, (b) the case of welding using an angled electrode with an axial center of a welding electrode of 5° or more from perpendicular to the surface of a steel sheet, (c) the case of welding using a welding gun with an axial center of an electrode bent 3° or more from perpendicular to the surface of a steel sheet during welding, (d) the case of welding in a state with a relative misalignment of the axial centers of facing welding electrodes of 0.5 mm or more, (e) the case of welding a welded location with a gap between mated surfaces of 0.5 mm or more, (f) the case of welding in the state with the position of the fixed side welding electrode from a steel sheet in the pressing direction having a clearance of 0.2 mm or more, and (g) the case of welding sheets combination including steel sheets with a strength ratio of over 2.5.

First, the cases (a) to (g) in which the test spot welding is preferably performed (cracking factors) will be described with reference to the drawings.

Figure 4:
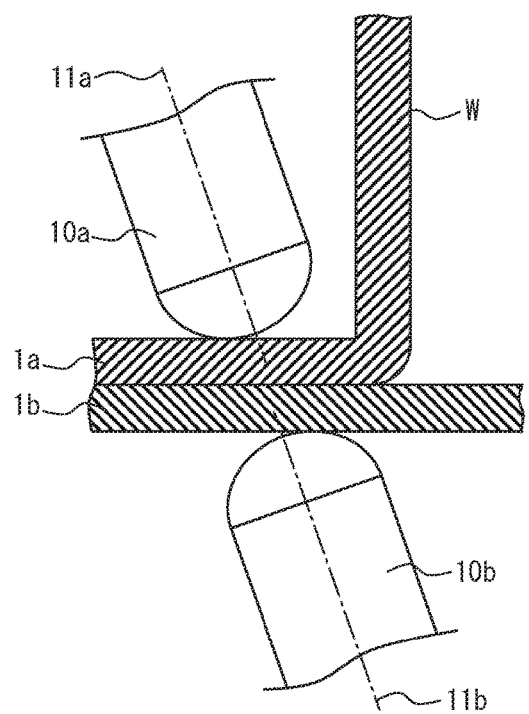
FIG. 4 is a cross-sectional view in the sheet thickness direction showing a state of welding at an angle.

(a) Case of Welding with an Angle of the Axial Center of a Welding Electrode of 3° or More from Perpendicular to the Surface of a Steel Sheet FIG. 4 is a cross-sectional view in the sheet thickness direction showing a state of welding given an angle of the axial center of 3° or more with respect to the surface of a steel sheet. The members to be welded shown in FIG. 4 are comprised of a steel sheet 1a and steel sheet 1b. The steel sheet 1a is a steel sheet having a cross-sectional channel shape having rising portions W. When spot welding the steel sheet 1a and the steel sheet 1b in the vicinity of such a rising portion W, the space around the welded location becomes narrow and a part of the spot welding gun may be blocked by the rising portion W.

In order to avoid this interference, the electrodes 10a and 10b may be positioned at an angle for the welding. The electrodes 10a and 10b are not positioned with their axial centers 11a and 11b perpendicular to the surfaces of the steel sheets 1a and 1b. In a state in which the front surfaces of the electrodes 10a and 10b and the steel sheets 1a and 1b are in contact with each other, the electrode 10a for the spot welding is inclined in a direction away from the rising portion W.

In the case of welding given an angle of the axial centers 11a and 11b of the welding electrodes of 3° or more from perpendicular with respect to the surfaces of the steel sheets 1a and 1b, in particular cracking easily occurs right outside the corona bond and at the nugget boundary of the corona bond of the mated surfaces of the steel sheets 1a and 1b. This is because if welding in a state with an electrode not perpendicularly abutting against a steel sheet surface, tensile stress is generated at the time of release of the electrode right outside the corona bond or inside the corona bond due to springback and causes internal cracking.

Figure 5:
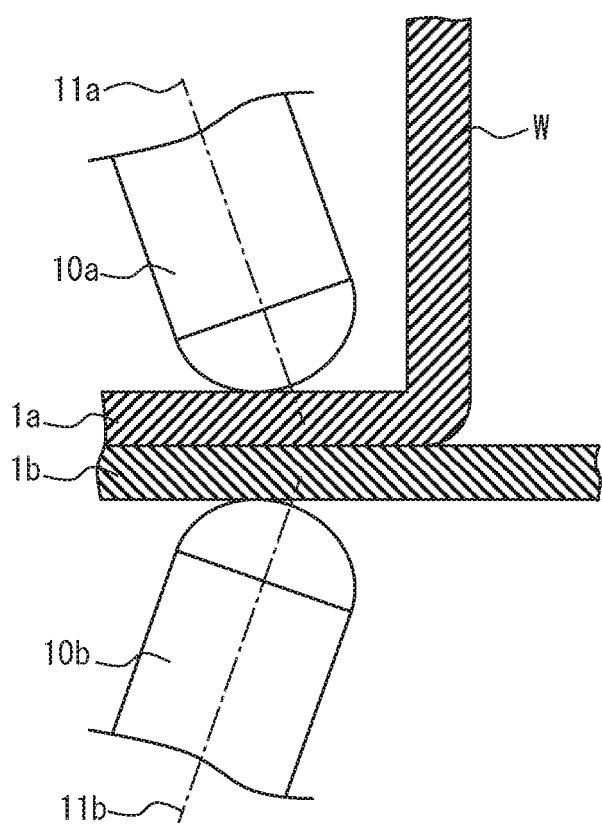
FIG. 5 is a cross-sectional view in the sheet thickness direction showing a state of welding using angled electrodes.

(b) Case of Welding Using an Angled Electrode with an Axial Center of a Welding Electrode of 5° or More from Perpendicular to the Surface of a Steel Sheet FIG. 5 is a cross-sectional view in the sheet thickness direction showing a state of welding using angled electrodes. The members to be welded shown in FIG. 5 are comprised of a steel sheet 1a and steel sheet 1b. The steel sheet 1a is a steel sheet having a cross-sectional channel shape having rising portions W. In the case of spot welding the steel sheet 1a and the steel sheet 1b in the vicinity of such a rising portion W, the space around the welded location becomes narrow and the arm of the spot welding gun or the like may be blocked by the rising portion W.

In order to avoid this interference, angled electrodes 10a and 10b are used. The angled electrodes 10a and 10b do not have axial centers 11a and 11b perpendicular to the surfaces of the steel sheets 1a and 1b. In the state where the front end faces of the angled electrodes 10a and 10b and the steel sheets 1a and 1b are in contact, the electrodes for spot welding are inclined in a direction away from the rising portion W.

In the case of welding using the angled electrodes 10a and 10b with axial centers 11a and 11b 5° or more from perpendicular with respect to the surfaces of the steel sheets 1a and 1b, in particular cracking right below an electrode and cracking near the outer circumference of the weld easily occur at the contact locations of the angled electrodes 10a and 10b and the steel sheets 1a and 1b. This is because the electrodes do not perpendicularly abut against the surfaces of the steel sheets and the plating metal melts during welding in a state where a stress component parallel to the steel sheet surfaces is generated.

Figure 6:
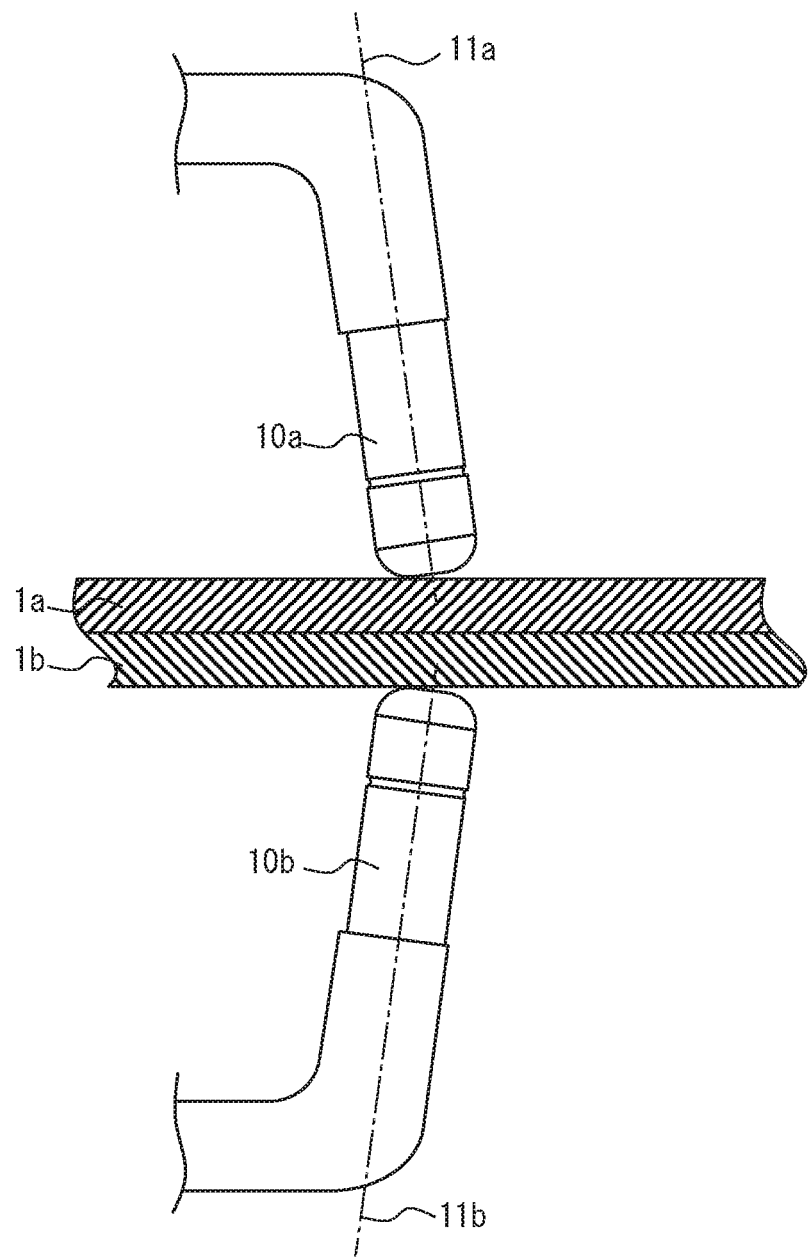
FIG. 6 is a cross-sectional view in the sheet thickness direction showing a state of welding using a flexible welding gun.

(c) Case of Welding Using a Welding Gun with an Axial Center of an Electrode Bent 3° or More from Perpendicular to the Surface of a Steel Sheet During Welding, FIG. 6 is a cross-sectional view in the sheet thickness direction showing the state of welding using a flexible welding gun (electrodes attached to the front ends of the welding gun). The welding electrodes 10a and 10b shown in FIG. 6 are arranged with axial centers 11a and 11b not perpendicular to the surfaces of the steel sheets 1a and 1b and with front end faces not parallel to the surfaces of the steel sheets 1a and 1b. If the welding gun (not shown) is bent by pressure by welding, the front end sides of the welding electrodes 10a and 10b are displaced in a direction away from holders (not shown) holding the welding electrodes.

In the case of welding using a welding gun in which the axial centers 11a and 11b of the welding electrodes are bent by 3° or more from perpendicular to the surfaces of the steel sheets 1a and 1b, in particular cracking right below an electrode and cracking near the outer circumference of the weld easily occur at the contact locations of the electrodes and steel sheets. If the welding gun is bent during welding, in the same way as the case of using angled electrodes, the electrodes will no longer perpendicularly abut against the steel sheet surfaces, stress components parallel to the surfaces of the steel sheets will be generated, and if the plating metal melts during welding, external cracking will occur at parts with high stress.

(d) Case of Welding in a State with a Relative Misalignment of the Axial Centers of Facing Welding Electrodes of 0.5 mm or More, FIG. 7 is a cross-sectional view in the sheet thickness direction showing a state of welding with relative misalignment in axial centers of the facing welding electrodes as is. As shown in FIG. 7, the welding electrodes 10a and 10b may have a relative misalignment 12 between the axial centers 11a and 11b due to poor mounting of the electrode tips (below, referred to as "electrode misalignment"). Further, in the case of a flexible welding gun shown in FIG. 6 when the vertical deflection is not uniform, an angle is generated at the electrodes and misalignment of the axial centers occurs.

When welding with an electrode misalignment 12 of the facing welding electrodes 10a and 10b of 0.5 mm or more as is, in particular, cracking right outside the corona bond, cracking at the nugget boundary of the corona bond, and cracking in the nugget easily occur at the mated surfaces of the steel sheets. If the axial centers of the electrodes are misaligned, the welding is performed in a state where stress shearing the steel sheets is generated. This being so, during application of current for welding and when ending current and the electrodes are opened, high stress is generated and cracking right outside the corona bond, cracking at the nugget boundary of the corona bond, and cracking in the nugget occur.

(e) Case of Welding a Welded Location with a Gap Between Mated Surfaces of 0.5 mm or More FIG. 8 is a cross-sectional view in a sheet thickness direction showing a state of welding a welded location having a gap at the mated surfaces. As shown in FIG. 8, when another member 13 is inserted between the steel sheets 1a and 1b etc., a gap 14 may be formed between the steel sheets 1a and 1b at the mated surfaces of the welded location (below, referred to as a "sheet gap").

When welding with the sheet gap 14 of the welded location of 0.5 mm or more as is, in particular cracking right outside the corona bond easily occurs at the mated surfaces of the steel sheets. When there is a gap, the welding is performed in a state with tensile stress acting on the surfaces on the mated surface sides of the steel sheets. The tensile stress is eased if the temperature of the steel sheets rises due to the application of current for welding, but if the steel sheets start to cool after the end of current, a strong tensile stress will appear. If the stress of the cracking limit is exceeded before the plating metal solidifies, cracking right outside the corona bond will occur.

(f) Case of Welding in the State with the Position of the Fixed Side Welding Electrode from a Steel Sheet in the Pressing Direction Having a Clearance of 0.2 Mm or More FIG. 9 is a cross-section in the sheet thickness direction showing a state of welding as is with unsuitable positions of the welding electrodes with respect to a plurality of steel sheets in the pressing direction. In spot welding, in order to make the positions of the welding electrodes with respect to the plurality of steel sheets in the pressing direction suitable, the welding electrode on the fixed side is made to abut against a steel sheet and that position is taught to the robot to perform the welding or an equalizing mechanism is provided between the robot and the spot welding gun so as to be able to move freely in the pressing direction to perform the welding.

However, in the case of a teaching error to the robot or in the case of not providing an equalizing mechanism, as shown in FIG. 9, the position of the fixed side welding electrode 10b with respect to the steel sheet 1b in the pressing direction becomes unsuitable, welding is performed with a clearance 15 remaining between the steel sheet 1b and the welding electrode 10b, and tensile stress is generated at the weld.

For this reason, when welding with a clearance 15 of 0.2 mm or more, in particular cracking right outside the corona bond and cracking at the nugget boundary of the corona bond easily occur at the mated surfaces of the steel sheets.

(g) Case of Welding Sheets Combination Including Steel Sheets with a Strength Ratio of Over 2.5.

FIG. 10 is a cross-section in the sheet thickness direction showing a state of welding a mild steel sheet in the middle and high strength steel sheets at the top and the bottom. In spot welding, three sheets are often welded together. However, if the difference in the tensile strengths of the steel sheets to be welded is large, for example, in the case of FIG. 10, in the spot welding process, the low strength mild steel sheet in the middle is pushed out from right below the electrodes and increased in thickness at the surroundings. At this time, the upper and lower high strength steel sheets are pressed at the top and bottom and tensile stress parallel to the steel sheet surfaces is generated at the surfaces of the high strength steel sheets.

If the strength difference of the steel sheets exceeds 2.5 times, cracking at the nugget boundary of the corona bond and cracking inside the nugget easily occur at the mated surfaces of the steel sheets.

Next, the welding method of the present invention will be described.

First, a plurality of steel sheets including at least one steel sheet covered with plating at least at the welded location are prepared. For example, two or more steel sheets with tensile strengths of 780 MPa or more, C contents of 0.15 mass % or more, and sheet thicknesses of 0.5 to 3.0 mm covered with galvanized plating at both surfaces are prepared.

Further, in actual production, when spot welding under conditions including one or more cracking factors of the above (a) to (g), test spot welding should be performed in advance.

In the test spot welding, two or more steel sheets are superposed under conditions including at least one of the cracking factors of the above (a) to (g) which occurs in actual production, electrodes comprised of a copper alloy etc. are pressed against the two or more steel sheets from the two sides to clamp them, and current is applied to form molten metal. After ending the current, heat is removed by the water-cooled electrodes and the heat conducted to the steel sheets themselves whereby the molten metal is rapidly cooled and made to solidify and a cross-sectional elliptical shaped nugget is formed between the steel sheets.

Figure 1:
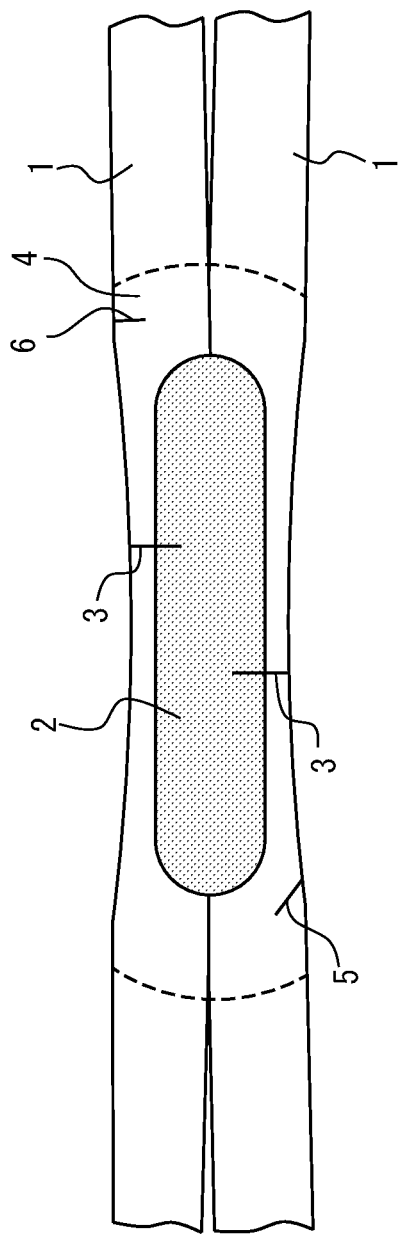
FIG. 1 is a cross-sectional view in the sheet thickness direction showing an outline of cracks in a spot welded location when spot welding a galvanized high-strength steel sheet.

After the test spot welding, any occurrence of cracking at the welded location is checked for. The cracking on the welding electrode side of the plurality of superposed steel sheets, that is, external cracking, is checked for by for example visual observation of the contact location. External cracking is checked for, as shown in FIG. 1, by cutting in the sheet thickness direction to include the nugget and checking the cross-section. Small cracking can also be checked for using a magnifying glass.

Figure 2:
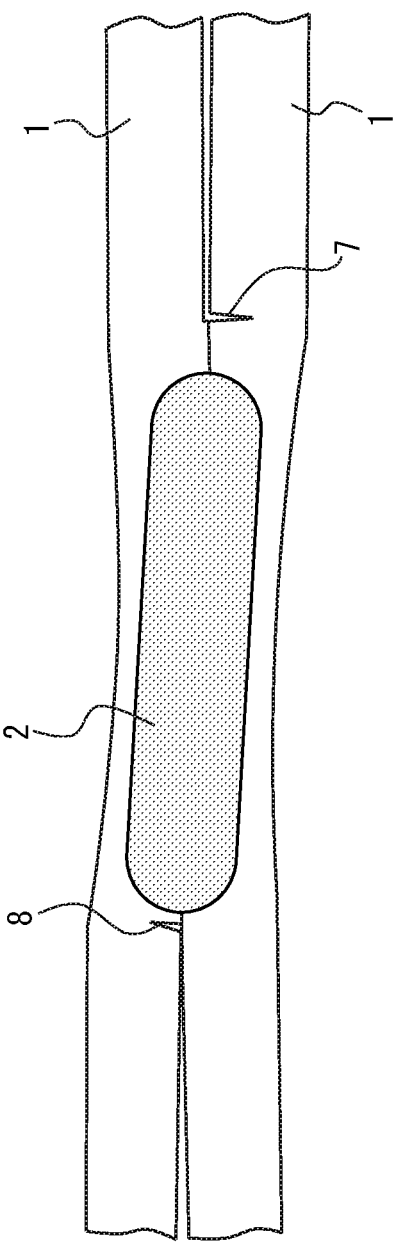
FIG. 2 is a cross-sectional view in the sheet thickness direction including a nugget.
Figure 3:
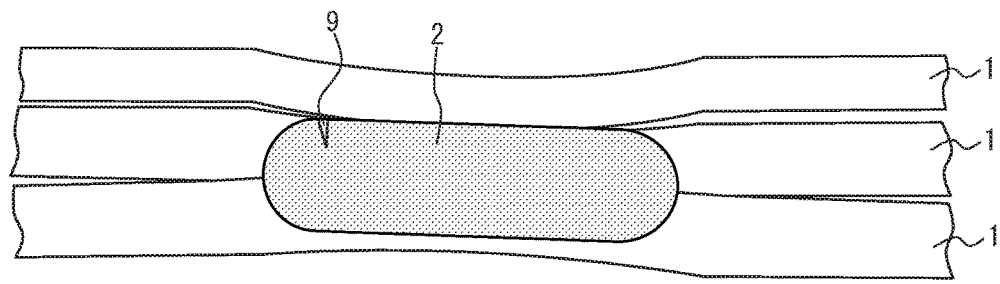
FIG. 3 is a cross-sectional view in the sheet thickness direction including a nugget.

Cracking at the mated surfaces of the steel sheets, that is, internal cracking, can be checked for, for example, by cutting in the sheet thickness direction so as to include the nugget as shown in FIG. 2 and FIG. 3 and checking the cross-section. Small cracking can also be checked for using a magnifying glass.

When spot welding a plurality of steel sheets where cracking of the welded location has been recognized and under conditions including a cracking factor, it is preferable to remove the plating before the spot welding.

In order to check the sizes of the weld heat affected zones, nugget, and corona bond, the joint is cut in the sheet thickness direction through the center of the depression resulting from the spot welding, is polished, then is etched by Nital or another chemical.

After that, two or more steel sheets from which plating has been removed are superposed and spot welded under conditions adjusting the current based on the welding conditions of the test spot welding. This current value is adjusted for correcting a change in the required current value due to removal of the plating so that a target nugget diameter can be obtained. It is usually necessary to adjust it to the low current side. Due to this, since there is no molten zinc present at the location where cracking occurs at the welded location, it is possible to prevent occurrence of liquid metal embrittlement cracking at the contact locations of the steel sheets with the electrodes and the mated surfaces of the steel sheets.

Next, the welding method of the present invention and, further, the necessary requirements and preferable requirements will be sequentially explained.

Plurality of Steel Sheets

The plurality of steel sheets to be spot welded are not particularly limited as long as a plurality of steel sheets including at least one steel sheet covered with plating at a welded location of at least one surface. For example, a combination of steel sheets covered with plating on the surfaces on the sides where the steel sheets and the electrodes contact, a combination of steel sheets covered with plating on the surfaces on the sides where the steel sheets and electrodes contact and steel sheets not covered with plating, a combination of steel sheets covered with plating on the surfaces where the steel sheets and electrodes contact and surfaces where the steel sheets are superposed, etc. may be illustrated. Further, considering the corrosion resistance of the welded joint, the surfaces at the sides where the steel sheets and electrodes contact and the surfaces where the steel sheets are superposed are preferably covered by plating.

The welding method of the present invention is suitable for spot welding steel sheets including galvanized steel sheets plated with an alloy including zinc. However, according to the principles of the present invention, even in the case of other plating such as Cu-based plating, it is clear that it is possible to obtain similar effects.

The plating covered on the steel sheets to be welded is not particularly limited so long as a plating containing zinc in the case of galvanized plating. For example, as the type of plating, galvannealed plating, hot dip galvanized plating, electrogalvanized plating, and zinc-nickel electroplating may be exemplified. Further, it can also include plating of a zinc-aluminum-magnesium system.

As a plurality of steel sheets to be spot welded, in FIG. 1 and FIG. 2, two steel sheets are described, but depending on the form of structural parts to be joined, a plurality of three of more steel sheets such as shown in FIG. 3 is also possible. The sheet thicknesses of the steel sheets which are spot welded are not particularly limited, but for example may be 0.5 to 3.0 mm. Further, the total sheet thickness of the plurality of steel sheets is also not particularly limited, but, for example, may be 1.0 to 7.0 mm.

Further, the plurality of steel sheets to be spot welded are not particularly limited in chemical composition, metal structure, etc. However, when using a low alloy TRIP steel sheet or steel sheet containing 0.15 mass % or more of C having a tensile strength of 780 MPa or more for steel sheets covered with galvanized plating on the surface at the side where the steel sheet and electrode contact or surface where steel sheets are superposed or for steel sheets superposed with steel sheets covered with galvanized plating through a galvanized plating, cracking at the welded locations easily occurs, so the welding method of the present invention is particularly effective for such steel sheets.

Further, the steel sheets need only have sheet-shaped parts at least at part and have parts where the sheet-shaped parts are stacked with each other. They need not be sheets as a whole. Further, the plurality of steel sheets are not limited to ones comprised of separate steel sheets. They may also be formed by a single steel sheet formed into a tubular shape or other predetermined shape and then superposed.

Test Spot Welding

Next, the test spot welding will be explained. The test spot welding is preferably carried out when satisfying one or more of the above (a) to (g) occurring in actual production.

The test spot welding is performed under the welding conditions used in actual production under conditions including the targeted sheets combination and the cracking factors of the above (a) to (g) occurring in actual production.

For the welding conditions, the welding conditions used in actual production are employed. For example, it is possible to make the electrodes dome radius types with front end diameters of 6 to 8 mm, the pressure 2.5 to 8.0 kN, the current-carrying time 5 to 99 cycles, and the current-carrying current 4 to 15 kA. However, for the value of the current-carrying current, it is desirable to employ the current value which is around the value set in actual production. This is because in a test at a pinpoint current-carrying current value, sometimes cracking of the welded locations will be overlooked. This is to deal with the fact that the electrode surfaces become worn with repeated welding and the current density falls even with the same current value, whereby the nugget size becomes close to the minimum nugget size targeted and the tensile stress generated in the weld and the range of melting of the plating metal change.

Confirmation of Cracking of Welded Location

In the spot welded joint obtained by the test spot welding, any occurrence of cracking at the welded location is checked for. The method of checking for any occurrence of cracking is not particularly limited. It can be performed by visual observation or penetrant inspection, observation of the cross-section in the sheet thickness direction including the melted and solidified part, judgment if a predetermined tensile strength is obtained after running a tensile test on the spot welded joint, etc. Alternatively, it may be checked for by performing an X-ray transmission test in addition to observation of the cross-section in the sheet thickness direction including the spot welded part.

The cracking right below the electrodes at the contact locations of the steel sheets and the electrodes occurs right below the electrodes at the contact locations of the steel sheets and the electrodes (near the center part), while cracking at the shoulders and cracking outside the electrodes occur in the vicinity of the outer circumference of the weld.

Cracking right outside the corona bond and at the nugget boundary of the corona bond at the mated surfaces of the steel sheets occurs at the mated surfaces of the steel sheets covered with plating or the mated surfaces of steel sheets not covered with plating superposed with steel sheets covered with plating. Further, it occurs inside the corona bond or its vicinity at these mated surfaces. Further, cracking inside the nugget occurs in spot welded joints of three or more steel sheets from the corona bond toward the nugget.

Removal of Plating

The welding method of the present invention is characterized by removing the plating of the steel sheets to be welded prior to the spot welding. The range of removal of the plating may be made the following ranges depending on the position of the cracking confirmed in the test spot welding.

When Cracking Confirmed at Contact Locations of Steel Sheets and their Vicinity

When confirming external cracking by the test spot welding, the range of the plating to be removed is made at least the range of the plating covered on the welding electrode side of a steel sheet at which external cracking is confirmed in the stacked plurality of steel sheets inside the circle with an outer circumference of the outer edge of the weld heat affected zone of the welding electrode side. Due to this, even if several cracking factors are superposed and strong stress is generated at the surface of the steel sheet at the side contacting the electrode, there is no molten plating metal present, so no external cracking occurs any longer.

External cracking includes cracking right below an electrode, cracking at a shoulder, and cracking outside of an electrode. For example, when no cracking right below an electrode can be confirmed and therefore not removing plating at the parts where the axial centers of the electrodes contact, if performing repeated spot welding, the molten plating metal or alloy of the plating metal and copper of the electrodes deposits through the electrodes on the surfaces of the steel sheets from which plating was removed due to cracking and cracking again occurs. For this reason, even if just one type of cracking occurs, it is necessary to remove the plating in the entire region inside the circle with an outer circumference of the outer edge of the weld heat affected zone at the welding electrode side.

Figure 11:
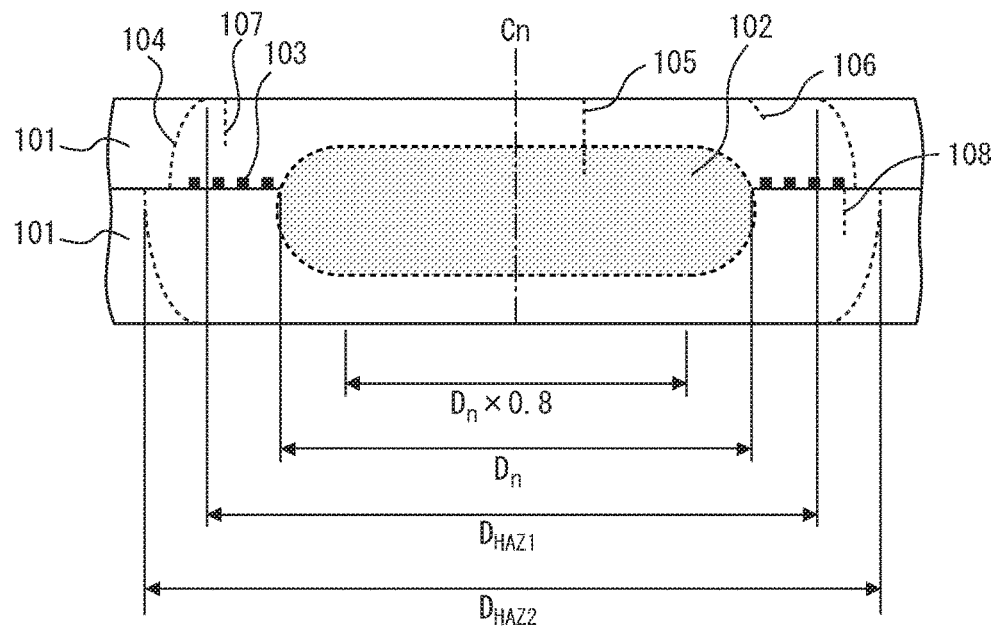
FIG. 11 is a cross-sectional view in the sheet thickness direction explaining the range of galvanized plating to be removed when confirming cracking in spot welding of two sheets combination.

Using FIG. 11, the range of plating specifically removed will be explained. FIG. 11 is a cross-sectional view in the sheet thickness direction explaining the range of plating removed when confirming cracking at the contact surface sides of the steel sheets with the electrodes and the mated surfaces of the steel sheets in two sheets combination. FIG. 11 shows by broken lines the scheduled location 102 of nugget formation, the scheduled location 103 of corona bond formation, the location 105 where cracking right below an electrode is predicted, the location 106 where cracking at an electrode shoulder is predicted, and the location 107 where cracking outside an electrode is predicted.

FIG. 11 also shows the scheduled position 104 of formation of the outer edge of a heat affected zone by dotted lines. The range of removal of plating for prevention of external cracking is made the inside of a circle of the diameter $D_{HAZ1}$ with an outer circumference of the outer edge of the heat affected zone. The scheduled position of formation of the outer edge of a heat affected zone of a steel sheet is a position where the steel sheet is heated to about 700° C. Therefore, in the welding process, the plating metal in this range melts and has sufficient liquidity. Therefore, even if removing the plating at only the portions where cracking occurs in order to prevent the external cracking, the surrounding plating becomes wet and spreads to the portions from which plating has been removed and the effect of removal of the plating is lost.

Due to the targeted precision of the welding position, the range for removing the plating may also be larger than the inside of a circle of the diameter $D_{HAZ1}$, that is, for example, the inside of a circle having a diameter of $D_{HAZ1} \times 1.5$. However, the corrosion resistance decreases, so it should be as narrow as possible.

Note that positions at the outer edge of the heat affected zone differ in distance from the nugget center Cn in the sheet thickness direction. This is because the sides where the steel sheets and electrodes contact are cooled by the electrodes, while such a cooling action does not act at the mated surfaces. The diameter $D_{HAZ1}$ of the range of removal of plating to prevent external cracking is preferably determined by the outer edge of the heat affected zone in the vicinity of the electrode side surfaces of the steel sheets.

Further, in order to determine the scheduled position of formation of the outer edge of the heat affected zone, Nital or another corrosive liquid may be used to observe the cross-section of the test spot weld zone.

When Confirming Cracking at Mated Surfaces of Steel Sheets (Internal Cracking)

When confirming by test spot welding cracking inside the nugget or cracking at the nugget boundary of the corona bond or cracking right outside the corona bond, the range of removal of plating is made the range at the mated surfaces of the steel sheets to be welded inside a circle with an outer circumference of a diameter of the broader outer edge of the weld heat affected zone of the mated surfaces of $D_{HAZ2}$. By removing the plating of this range, even if several cracking factors overlap and strong stress is generated in the mated surfaces of the steel sheets, there is no molten plating metal, so no internal cracking occurs.

Further, the range of removal of plating may also be made the range of the inside of a ring with an outer circumference of the broader outer edge of the weld heat affected zones formed at the mated surfaces of the superposed steel sheets and with an inner circumference of a circle sharing a center with a scheduled position becoming the center of the nugget formed at the mated surfaces of the steel sheets and having a diameter of 0.8 time the nugget diameter. This is because the plating inside the circle having a diameter of 0.8 time of the nugget diameter does not substantially contribute to the internal cracking.

By limiting the range of removal of plating in this way, it is possible to suppress to a maximum the change in welding conditions caused by the removal of the plating.

Using FIGS. 11 and 12, the range of plating specifically removed will be explained. FIG. 11 is a cross-sectional view in the sheet thickness direction explaining the range of plating removed when confirming cracking at mated surfaces of the steel sheets in two sheets combination. FIG. 11 shows by broken lines the scheduled location 102 of nugget formation, the scheduled location 103 of corona bond formation, and the location 108 where cracking is predicted right outside the corona bond at the steel sheets 101 welded superposed.

Figure 12:
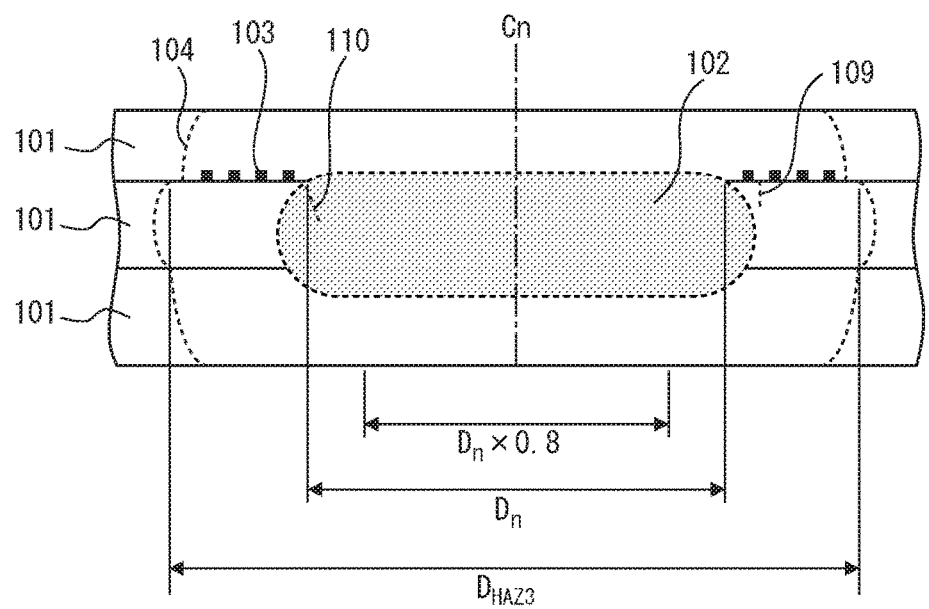
FIG. 12 is a cross-sectional view in the sheet thickness direction explaining the range of galvanized plating to be removed when confirming internal cracking of mated surfaces of steel sheets in spot welding a set of three sheets.

FIG. 12 shows by broken lines a location 109 where occurrence of cracking at the nugget boundary of the corona bond is predicted and a location 110 where occurrence of cracking inside the nugget is predicted.

Internal cracking is caused in the welding process by the plating metal melted between steel sheets remaining at a portion where tensile stress acts.

The cracking right outside the corona bond is caused by the molten plating metal melted at the scheduled location of corona bond formation and ejected by pressing by the electrodes and the molten plating metal at the inside of the heat affected zone and outside of the corona bond being wet right outside the corona bond and the action of tensile stress in that state.

The cracking inside the corona bond and cracking at the nugget boundary of the corona bond is caused by the molten plating metal melted near the outer edge of the scheduled position of nugget formation and ejected by pressing by the electrodes and the molten plating metal at the scheduled location of corona bond formation being sealed inside the corona bond and the action of tensile stress in that state.

That is, internal cracking is caused in the welding process by the molten plating metal in the heat affected zone and the molten plating metal melted at the mated surfaces of the steel sheets and successively ejected in a direction away from the center of the nugget (outward direction). Therefore, the plating has to be removed not only near the position of occurrence of internal cracking, but also at the heat affected zone at the outside from the nugget center and a range including the scheduled position of nugget formation near the nugget center. Here, the "molten plating metal" of course also includes plating metal which liquefies after evaporation and vaporization.

When confirming the internal cracking, the range of the plating to be removed is made the mated surfaces of the steel sheets to be welded in a range of the inside of a circle with an outer circumference of a circle equivalent diameter $D_{HAZ2}$ of the broader outer edge of the heat affected zone of the mated surfaces and centered on the center Cn of the scheduled location 102 of nugget formation. Note that the "circle equivalent diameter of an outer edge of a weld heat affected zone" is the diameter of a circle of the same area as the area of the broader outer edge of the heat affected zone at the mated surfaces of two superposed steel sheets.

The plating has to be removed from both the plating of the superposed steel sheets. This is because if superposing plated steel sheets, even if removing just the plating of the cracked steel sheet, molten plating metal will be supplied from the other superposed steel sheet. By removing the plating of this range of plating in this way, several cracking factors become superposed. Even if a strong tensile stress occurs at the mated surfaces of the steel sheets, there is no molten plating metal present, so no internal cracking occurs.

Further, the range of removal of the plating may be made a range of the inside of a ring with an outer circumference of a circle centered at the center Cn of the scheduled location 102 of nugget formation and having a diameter of $D_{HAZ2}$ or $D_{HAZ3}$ and with an inner circumference of a circle centered at the center Cn of the scheduled location 102 of nugget formation formed at the mated surfaces of the steel sheets and having a diameter of a diameter 0.8 time the nugget Dn formed at the mated surfaces. This is because the plating inside the circle with a diameter 0.8 time the nugget does not substantially contribute to internal cracking.

The plating metal covered at the outside of a circle of 0.8 time the circle equivalent diameter Dn of the scheduled location of nugget formation is in large part ejected into the corona bond in the welding process. Therefore, in order to suppress internal cracking, it is necessarily to reliably remove the plating covered in this range. On the other hand, the plating metal covered inside of the circle of 0.8 time the circle equivalent diameter Dn of the scheduled location of nugget formation is in small part discharged in the corona bond, so need not be proactively removed.

Furthermore, by leaving without removal the plating at the inside of a circle of a diameter 0.8 time the nugget diameter Dn, it is possible to prevent the welding conditions from greatly changing due to removal of the plating metal.

Note that, if the range of removal of plating becomes broader, there is a possibility that corrosion will occur from the removed location. It is not preferable to blindly remove the plating, but this does not stop removal of plating beyond the range defined in the present invention in order to prevent weld cracking.

The plating covering a range exceeding the circle equivalent diameter $D_{HAZ2}$ or $D_{HAZ3}$ of the scheduled location of formation of the outer edge of the heat affected zone may also be removed considering the positional accuracy of the spot welding, but the corrosion resistance would fall, so in the case of removal, an effort should be made to improve the positional accuracy of the spot welding and the range made all of the part of 5.0 times or less the circle equivalent diameter $D_{HAZ2}$ or $D_{HAZ3}$ of the scheduled location of formation of the outer edge of the heat affected zone.

The plating to be removed can be made all of the part of 2.0 times or less the circle equivalent diameter $D_{HAZ2}$ or $D_{HAZ3}$ more preferably 1.5 times or less.

Further, the equivalent circle diameters $D_{HAZ2}$ and $D_{HAZ3}$ of the scheduled location of formation of the outer edge of the heat affected zone and circle equivalent diameter Dn of scheduled location of nugget formation are circle equivalent diameters observed at the time of determining the welding conditions by coupons (test pieces) before spot welding the plurality of steel sheets. In actual spot welding as well, the weld lengths are not necessarily all the same, but if the range of removal of plating of the welding method of the present invention, it is possible to sufficiently cover error in this.

Spot Welding after Plating Removal

In spot welding a plurality of steel sheets including a steel sheet from which plating at a specific position is removed, when confirming cracking of a location of contact of the steel sheets and electrodes or cracking of the mated surfaces of the steel sheets, the current value is adjusted so that the nugget diameter becomes the same as the time of test spot welding. Due to this, it is possible to secure the strength of the spot welded joint originally targeted.

Coating Sealer or Adhesive

By removing the plating, the corrosion resistance of the welded locations of the steel sheets and electrodes and the mated surfaces of the steel sheets may become insufficient. Therefore, when removing the plating of the scheduled locations of contact of the steel sheets and the welding electrodes, after spot welding, preferably part or all of the parts from which plating is removed are coated with a sealer, while when removing the plating of the mated surfaces of the steel sheets, before spot welding, preferably part or all of the parts from which plating is removed is coated with a sealer or adhesive.

The sealer or adhesive is not particularly limited. A known one used in assembly of car bodies may be used. Further, mixing metal particles made of zinc etc. with the sealer or adhesive in advance is also effective in securing the corrosion resistance.

Method of Removing Plating

The method of removing the plating may employ at least one of mechanical removal and removal by evaporation. As mechanical removal, a rotating tool can be used to grind away the plating. At this time, if grinding by a tool with a projection at the circle equivalent center such as the scheduled location of contact, the center of rotation is determined and the plating can be precisely removed. By making the projection sufficiently small, it is possible to bury the hole formed by the projection by welding.

Removal by evaporation is the method of firing a laser beam having a circular shape, ring shape, square shape, or other focused shaped exceeding the range which must be removed so as to remove plating by evaporation. According to this, it is possible to selectively remove zinc, magnesium, and other low-boiling metals that cause liquid metal embrittlement.

In firing the laser beam, it is important to fire it at an angle so that the reflected beam does not return to the oscillator. From the viewpoint of environmental protection, it is preferable to provide a device for sucking in the vaporized metal. Further, the laser beam focused to tens of μm may be used to remove the plating by ablation. Further, by firing plasma, the plating can be removed by evaporation.

EXAMPLES

Next, a description will be given of examples of the present invention. The conditions in the examples are illustrations of conditions employed for confirming the workability and effects of the present invention. The present invention is not limited to these illustrations of conditions. The present invention may employ various conditions so long as not deviating from the gist of the present invention and achieving the object of the present invention.

Table 1 shows the steel sheets used. The galvanized steel sheets A to E are galvannealed steel sheets covered at both surfaces with galvanization.

TABLE 1

| Steel type | C content (mass %) | Tensile strength (MPa) | Sheet thickness (mm) | Galvanized plating deposition (g/m$^2$) |
|---|---|---|---|---|
| Galvanized steel sheet A | 0.20 | 1200 | 1.6 | 50 |
| Galvanized steel sheet B | 0.24 | 980 | 1.6 | 55 |
| Cold-rolled steel sheet | 0.18 | 1200 | 1.6 | None |
| Galvanized steel sheet C | 0.22 | 1200 | 1.0 | 50 |
| Galvanized steel sheet D | 0.003 | 270 | 1.0 | 50 |
| Galvanized steel sheet E | 0.16 | 440 | 1.0 | 50 |

Two or three steel sheets shown in Table 1 were used for spot welding.

Test No. 1 is a comparative example of spot welding without removing the galvanization in a state where the axial center of the welding electrode is 3° from perpendicular to the surface of the steel sheet. The spot welding was performed from both sides by using dome radius-type electrodes with front end diameters of 6 mm to sandwich two steel sheets and press against them by a pressing force of 4 kN and by welding by a current-carrying time of 18 cycles and a current-carrying current of 9 kA. As a result, internal cracking right outside a corona bond was confirmed.

The subsequent examples were the same in the conditions of the spot welding as in Test No. 1.

Test Nos. 2 to 6 are examples of removing the galvanization for spot welding in view of the results of Test No. 1.

Test No. 7 is a comparative example using an angled electrode with an axial center of 5° from perpendicular to the surface of a steel sheet during welding to spot weld the sheets without removing the galvanization in the state of a gap of the mated surfaces of 0.5 mm. In Test No. 7, internal cracking right outside the corona bond was confirmed.

Test No. 8 is an example of removing the galvanization for spot welding in view of the results of Test No. 7.

Test No. 9 is a comparative example of spot welding a combination of steel sheets with a large strength ratio without removing the galvanization. In Test No. 9, internal cracking was observed at the nugget boundary inside the corona bond.

Test Nos. 10 to 12 are examples of removing the galvanization for spot welding in view of the results of Test No. 9.

Test No. 13 is a comparative example of spot welding without removing the galvanization in the state with the axial centers of the facing welding electrodes being relatively misaligned by 0.5 mm and in the state with the fixed side welding electrode being positioned 0.2 mm from a steel sheet in the pressing direction. In Test No. 13, internal cracking advancing from inside the corona bond to inside the nugget was confirmed.

Test Nos. 14 to 17 are examples of removing the galvanization for spot welding in view of the results of Test No. 9.

Test No. 18 is a comparative example using a welding gun with an axial center bent 3° from perpendicular with respect to the surface of the steel sheet and spot welding without removing the galvanization. In Test No. 18, external cracking was confirmed right below the electrode and at the shoulder.

Test Nos. 19 to 20 are examples of removing the galvanization for spot welding in view of the results of Test No. 18.

Test No. 21 is a comparative example using a welding gun bent so that its axial center becomes 3° from perpendicular to the surface of a steel sheet during welding and, further, spot welding a welded location having a gap of the mated surfaces of 0.5 mm or more without removing the galvanization. In Test No. 21, external cracking was confirmed outside of the electrode.

For removal of the galvanized plating, removal by evaporation or mechanical removal was used.

For removal by evaporation, the galvanization was heated by laser or plasma.

For removal of the galvanization using evaporation by a laser, a laser focused to a diameter of 9.5 mm was fired at the galvanization by an output of 1 kW for 0.1 second to remove the galvanization in the removal range.

For removal of the galvanization by laser ablation, a laser focused to a diameter of 40 μm was fired at the galvanization by an average output of 9 W, a number of repetitions of 50 kHz, a pulse width (time emitting the laser) of 20 ns, 10 shots at the same point and the entire area of the removal range was scanned to remove the galvanization.

For removal using plasma, discharge was caused by a current of 200 A and a voltage of 20V to heat the galvanization for 0.2 second. The plasma had a distribution of energy density, so the targeted range of galvanization was completely removed and the surroundings were also partially removed.

In mechanical removal, a rotary tool was used for grinding to remove the galvanization in the removal range.

The test piece was subjected to a combined cycle corrosion test (CCT test) to confirm the corrosion resistance and checked for cracks at the welded location. The results are shown in Tables 2 to 4. Note that letters for the cracking factors in Tables 2 to 4 correspond to the cases where the above-mentioned test spot welding is preferably performed (cracking factors).

The CCT test was performed based on the corrosion testing method for automobiles (JASO M609-91) by repeatedly treating the test piece for 8 hours per cycle for 30 cycles. One cycle consisted of a salt spray test (2 hours, 5% NaCl, 35° C.), drying (4 hours, 30% RH, 60° C.), and a wetting test (2 hours, 95% RH, 50° C.)

The spot weld was evaluated as "Very Good" when no changes could be seen around the spot weld zone between the steel sheets, "Good" when white rust could be observed, and "Poor" when red rust formed. Further, cracking was checked by cutting a test piece in the sheet thickness direction to include the nugget and observing the cross-section.

The results of removing the galvanization and then spot welding were as follows:

Test Nos. 2 to 3, 8, 10, 14 to 15, 19 to 20, and 22 to 23 removed the galvanization in the range defined in the present invention and then spot welded the sheets. As a result, no cracks formed at the weld and the corrosion resistance was good. In Test No. 2, the location from which the galvanization was removed was coated with an adhesive. In Test No. 20, the part from which the plating was removed was coated with a sealer after welding. Therefore, particularly good corrosion resistance was exhibited.

Test Nos. 4 to 6 removed the galvanization, but the removal range was narrow and internal cracking occurred right outside the corona bond.

Test Nos. 11 to 12 removed the galvanization, but the removal range was narrow and internal cracking advancing from the corona bond to the nugget boundary was formed.

Test Nos. 16 to 17 removed the galvanization, but the removal zone was narrow and internal cracking advancing from the corona bond to the inside of the nugget occurred.

TABLE 2

| Test number | Class | Set of sheets | Plating removal method | Removal range | Adhesive/sealer | CCT test results | Cracking | Cracking position | Cracking factor |
|---|---|---|---|---|---|---|---|---|---|
| 1 | Comp. ex. | Steel type A, 2 sheets superposed | — | — | None | Very Good | Yes | Internal cracking right outside corona bond | a |
| 2 | Inv. ex. | Steel type A, 2 sheets superposed | Laser | Plating layers on borh sides of mated surfaces, inside circle with outer circumference formed by outer edge of heat affected zone | Adhesive | Very Good | Nothing | — | a |
| 3 | Inv. ex. | Steel type A, 2 sheets superposed | Laser | Plating layers on both sides of mated surfaces, inside ring with inner circumference at least 0.8 time nugget diameter and outer circumference formed by outer edge of heat affected zone | None | Good | Nothing | — | a |
| 4 | Comp. ex. | Steel type A, 2 sheets superposed | Laser | Plating layers on both sides of mated surfaces, inside ring with inner circumference at least 0.9 time nugget diameter and outer circumference formed by outer edge of heat affected zone | Adhesive | Very Good | Yes | Internal cracking right outside corona bond | a |

TABLE 2-continued

| Test number | Class | Set of sheets | Plating removal method | Removal range | Adhesive/ sealer | CCT test results | Cracking | Cracking position | Cracking factor |
|---|---|---|---|---|---|---|---|---|---|
| 5 | Comp. ex. | Steel type A, 2 sheets superposed | Laser | Plating layers on both sides of mated surfaces. Inside ring with inner circumference having diameter of at least 0.8 time nugget diameter and with outer circumference having diameter of 0.9 time diameter of outer edge of heat affected zone. | None | Good | Yes | Internal cracking right outside corona bond | a |
| 6 | Comp. ex. | Steel type A, 2 sheets superposed | Laser | Plating layer of side where crack is seen at mated surfaces. Inside circle with outer circumference formed by outer edge of heat affected zone. | None | Good | Yes | Internal cracking right outside corona bond | a |
| 7 | Comp. ex. | Two sheets of Galvanized steel sheet D and cold-rolled steel sheet superposed | — | — | None | Very Good | Yes | Internal cracking right outside corona bond | b, e |
| 8 | Inv. ex. | Two sheets of Galvanized steel sheet D and cold-rolled steel sheet superposed | Laser ablation | Plating layers of mated surfaces. Inside circle with outer circumference formed by outer edge of heat affected zone. | None | Good | None | — | b, e |

TABLE 3

(Continuation of Table 2)

| Test number | Class | Set of sheets | Plating removal method | Removal range | Adhesive/ sealer | CCT test results | Cracking | Cracking position | Cracking factor |
|---|---|---|---|---|---|---|---|---|---|
| 9 | Comp. ex. | Galvanized steel sheet C/Galvanized steel sheet E/Galvanized steel sheet C | — | — | None | Very Good | Yes | Nugget boundary of corona bond | g |
| 10 | Inv. ex. | Galvanized steel sheet C/Galvanized steel sheet E/Galvanized steel sheet C | Plasma | Plating layers of both sides of mated surfaces. Inside cylindrical tube with inner circumference of diameter of at least 0.8 time nugget diameter and with outer circumference of diameter forming outer edge of heat affected zone. | Yes | Very Good | None | — | g |
| 11 | Comp. ex. | Galvanized steel sheet C/Galvanized steel sheet E/Galvanized steel sheet C | Plasma | Plating layers on both sides of mated surfaces. Inside cylindrical tube with inner circumference of diameter of at least 0.9 time nugget diameter and with outer circumference of diameter of outer edge of heat affected zone. | None | Good | Yes | Nugget boundary of corona bond | g |
| 12 | Comp. ex. | Galvanized steel sheet C/Galvanized steel sheet E/Galvanized steel sheet C | Plasma | Plating layers on both sides of mated surfaces. Inside cylindrical tube with inner circumference of diameter of at least 0.8 time nugget diameter and with outer circumference of diameter of 0.9 time diameter of outer edge of heat affected zone | None | Very Good | Yes | Nugget boundary of corona bond | g |

TABLE 3-continued (Continuation of Table 2)

| Test number | Class | Set of sheets | Plating removal method | Removal range | Adhesive/sealer | CCT test results | Cracking | Cracking position | Cracking factor |
|---|---|---|---|---|---|---|---|---|---|
| 13 | Comp. ex. | Galvanized steel sheet D/Galvanized steel sheet C/Galvanized steel sheet C | | — | None | Good | Yes | Cracking advancing from corona bond to inside nugget | d, f |
| 14 | Inv. ex. | Galvanized steel sheet D/Galvanized steel sheet C/Galvanized steel sheet C | Laser | Plating layers on both sides of mated surfaces. Inside cylindrical tube with inner circumference of diameter of at least 0.6 time nugget diameter and with outer circumference of diameter of 1.1 times diameter of outer edge of heat affected zone. | Yes | Very Good | Nothing | — | d, f |
| 15 | Inv. ex. | Galvanized steel sheet D/Galvanized steel sheet C/Galvanized steel sheet C | Laser | Plating layers on both sides of mated surfaces. Inside cylindrical tube with inner circumference of diameter of at least 0.8 time nugget diameter and with outer circumference of diameter of outer edge of heat affected zone. | None | Good | Nothing | — | d, f |
| 16 | Comp. ex. | Galvanized steel sheet D/Galvanized steel sheet C/Galvanized steel sheet C | Laser | Plating layer on both sides of circumference of diameter of at least 0.9 time nugget diameter and with outer circumference of diameter of outer edge of heat affected zone. | None | Good | Yes | Cracking advancing from corona bond to inside nugget | d, f |
| 17 | Comp. ex. | Galvanized steel sheet D/Galvanized steel sheet C/Galvanized steel sheet C | Laser | Plating layers of both sides of mated surfaces. Inside ring with inner circumference of nugget diameter and with outer circumference of diameter of 0.9 time diameter of outer edge of heat affected zone. | None | Good | Yes | Cracking advancing from corona bond to inside nugget | d, f |

TABLE 4

(Continuation of Table 3)

| Test number | Class | Set of sheets | Plating removal method | Removal range | Adhesive/sealer | CCT test results | Cracking | Cracking position | Cracking factor |
|---|---|---|---|---|---|---|---|---|---|
| 18 | Comp. ex. | Two sheets of galvanized steel sheet B and cold-rolled steel sheet superposed | | — | None | Very Good | Yes | Cracking right below electrode and cracking at shoulder | c |
| 19 | Inv. ex. | Two sheets of galvanized steel sheet B and cold-rolled steel sheet superposed | Laser ablation | Galvanized layer in contact with electrode, inside circle with outer circumference of outer edge of heat affected zone. | None | Good | None | — | c |
| 20 | Inv. ex. | Two sheets of galvanized steel sheet B and cold-rolled steel sheet superposed | Laser ablation | Galvanized layer in contact with electrode, inside circle with outer circumference of outer edge of heat affected zone. | Welding plating removal part, then coating sealer | Very Good | None | — | c |

TABLE 4-continued (Continuation of Table 3)

| Test number | Class | Set of sheets | Plating removal method | Removal range | Adhesive/ sealer | CCT test results | Cracking | Cracking position | Cracking factor |
|---|---|---|---|---|---|---|---|---|---|
| 21 | Comp. ex. | Two sheets of galvanized steel sheet B and cold-rolled steel sheet superposed | — | | None | Very Good | Yes | Cracking at outside of electrode | c, e |
| 22 | Inv. ex. | Two sheets of galvanized steel sheet B and cold-rolled steel sheet superposed | Grinding | Galvanized layer in contact with electrode, inside circle with outer circumference of outer edge of heat affected zone. | None | Good | Nothing | — | c, e |
| 23 | Comp. ex. | Two sheets of galvanized steel sheet B and cold-rolled steel sheet superposed | Grinding | Galvanized layer in contact with electrode, inside circle with outer circumference of diameter of 0.9 time diameter of outer edge of heat affected zone. | None | Good | Yes | Cracking at outside of electrode | c, e |

INDUSTRIAL APPLICABILITY

According to the present invention, in spot welding, it is possible to simply prevent the occurrence of liquid metal embrittlement cracking. Accordingly, the present invention is high in industrial applicability.

REFERENCE SIGNS LIST 1, 1a, 1b. steel sheets
2. nugget
3. cracking right below electrode
4. heat affected zone
5. cracking at shoulder
6. cracking outside electrode
7. cracking right outside corona bond
8. crack at nugget boundary of corona bond
9. cracking inside nugget
10a, 10b. electrodes
11a, 11b. axial centers
12. electrode misalignment
13. member
14. gap
15. clearance
101. steel sheet
102. scheduled location of formation of nugget
103. scheduled position of formation of corona bond
104. scheduled position of formation of outer edge of heat affected zone
105. scheduled location of occurrence of cracking right below electrode
106. scheduled location of occurrence of cracking at shoulder of electrode
107. scheduled location of occurrence of cracking outside of electrode
108. scheduled location of occurrence of cracking right outside of corona bond
109. scheduled location of occurrence of cracking at nugget boundary of corona bond
110. scheduled location of occurrence of cracking inside nugget
Cn. center of scheduled location of formation of nugget
Dc. circle equivalent diameter of scheduled location of formation of corona bond
Dn. circle equivalent diameter of scheduled location of formation of nugget
$D_{HAZ1}$. diameter of range for removing plating to avoid external cracking
$D_{HAZ2}$. diameter of range for removing plating to avoid internal cracking in two superposed sheets combination
$D_{HAZ3}$. diameter of range for removing plating to avoid internal cracking in three superposed sheets combination
W. rising portion

The invention claimed is:

1. A method of spot welding of a stacked plurality of steel sheets, one or more of the stacked plurality of steel sheets having a welding part coated with plating on at least one surface,
   the method comprising:
   test spot welding,
   confirming any occurrence of cracking in the welded part,
   when confirming cracking of the welding electrode sides of the stacked plurality of steel sheets, removing the plating of a welding electrode side of the stacked plurality of steel sheets where cracking was confirmed from range of removal of plating, wherein an outer edge of the range of removal of plating is at a minimum an outer periphery of a weld heat affected zone formed at the surface of the welding electrode side of the stacked plurality of steel sheets and at a maximum 1.5 times a circle equivalent diameter of a schedules location of the outer periphery of the weld heat affected zone,
   clamping the stacked plurality of steel sheets with welding electrodes facing the steel sheets, and
   spot welding the stacked plurality of steel sheets.

2. The method of a spot welding according to claim 1, further comprising, after spot welding, coating by a sealer part or all of the part from which the plating has been removed.

3. The method of a spot welding according to claim 2, wherein the plating is removed by at least one of mechanical removal and removal by evaporation.

4. The method of a spot welding according to claim 1, wherein the step of test spot welding is performed when the spot welding is performed under conditions including at least one of
   (a) the case of welding with an angle of the axial center of a welding electrode of 3° or more from perpendicular to the surface of a steel sheet,
   (b) the case of welding using an angled electrode with an axial center of a welding electrode of 5° or more from perpendicular to the surface of a steel sheet,
   (c) the case of welding using a welding gun with an axial center of an electrode bent 3° or more from perpendicular to the surface of a steel sheet during welding,
   (d) the case of welding in a state with a relative misalignment of the axial centers of facing welding electrodes of 0.5 mm or more,
   (e) the case of welding a welding part with a gap between mated surfaces of 0.5 mm or more,
   (f) the case of welding in the state with the position of the fixed side welding electrode from a steel sheet in the pressing direction having a clearance of 0.2 mm or more, and
   (g) the case of welding sheets combination including steel sheets with a strength ratio of over 2.5.

5. The method of a spot welding according to claim 4, further comprising removing the plating of the steel sheets where no cracking was confirmed at the test spot welding.

6. The method of a spot welding according to claim 1, further comprising removing the plating of the steel sheets where no cracking was confirmed at the test spot welding.

7. The method of a spot welding according to claim 1, wherein the plating is removed by at least one of mechanical removal and removal by evaporation.

8. The method of a spot welding according to claim 1, wherein the plating is galvanized plating.

9. A method of spot welding of a stacked plurality of steel sheets, one or more of the stacked plurality of steel sheets having a welding part coated with plating on at least one surface,
   the method comprising:
   test spot welding,
   confirming any occurrence of cracking in the welded part,
   when confirming cracking of the stacked plurality of steel sheets, removing the plating at the cracked surfaces of the steel sheets where cracking was confirmed and the mated surfaces of the stacked plurality of steel sheets from a range of removal of plating, wherein an outer edge of the range of removal of plating is at a minimum an outer periphery of a broadest weld heat affected zone formed at mated surfaces of the stacked plurality of steel sheets and at maximum 5.0 times a circle equivalent diameter of a scheduled location of the outer periphery of the weld heat affected zone,
       clamping the stacked plurality of steel sheets with welding electrodes facing the steel sheets, and
       spot welding the stacked plurality of steel sheets.

10. The method of a spot welding according to claim 9, further comprising, before spot welding, coating by a sealer or adhesive part or all of the part from which the plating has been removed.

11. The method of a spot welding according to claim 9, wherein the step of test spot welding is performed when the spot welding is performed under conditions including at least one of
   (a) the case of welding with an angle of the axial center of a welding electrode of 3° or more from perpendicular to the surface of a steel sheet,
   (b) the case of welding using an angled electrode with an axial center of a welding electrode of 5° or more from perpendicular to the surface of a steel sheet,
   (c) the case of welding using a welding gun with an axial center of an electrode bent 3° or more from perpendicular to the surface of a steel sheet during welding,
   (d) the case of welding in a state with a relative misalignment of the axial centers of facing welding electrodes of 0.5 mm or more,
   (e) the case of welding a welding part with a gap between mated surfaces of 0.5 mm or more,
   (f) the case of welding in the state with the position of the fixed side welding electrode from a steel sheet in the pressing direction having a clearance of 0.2 mm or more, and
   (g) the case of welding sheets combination including steel sheets with a strength ratio of over 2.5.

12. The method of a spot welding according to claim 9, further comprising removing the plating of the steel sheets where no cracking was confirmed at the test spot welding.

13. A method of spot welding of a stacked plurality of steel sheets, one or more of the stacked plurality of steel sheets having a welding part coated with plating on at least one surface, the method comprising:
   test spot welding,
   confirming any occurrence of cracking in the welded part,
   when confirming cracking of the stacked plurality of steel sheets, removing the plating at the cracked surfaces of the steel sheets where cracking was confirmed and the mated surfaces of the stacked plurality of steel sheets from a circular ring area, wherein an outer edge of the circular ring area is at a minimum an outer periphery of a broadest weld heat affected zone formed at mated surfaces of the stacked plurality of steel sheets and at maximum 5.0 times a circle equivalent diameter of a scheduled location of the outer periphery of the weld heat affected zone, and an inner edge of the circular ring area is a circle sharing a center of a scheduled position becoming a center of a nugget formed at the mated surfaces of the steel sheets and having a diameter of 0.8 times the diameter of the nugget or less;
   clamping the stacked plurality of steel sheets with welding electrodes facing the steel sheets; and
   spot welding the stacked plurality of steel sheets.

14. The method of a spot welding according to claim 13, further comprising, before spot welding, coating by a sealer or adhesive part or all of the part from which the plating has been removed.

15. The method of a spot welding according to claim 13, wherein the step of test spot welding is performed when the spot welding is performed under conditions including at least one of
   (a) the case of welding with an angle of the axial center of a welding electrode of 3° or more from perpendicular to the surface of a steel sheet,
   (b) the case of welding using an angled electrode with an axial center of a welding electrode of 5° or more from perpendicular to the surface of a steel sheet,
   (c) the case of welding using a welding gun with an axial center of an electrode bent 3° or more from perpendicular to the surface of a steel sheet during welding,
   (d) the case of welding in a state with a relative misalignment of the axial centers of facing welding electrodes of 0.5 mm or more, (e) the case of welding a welding part with a gap between mated surfaces of 0.5 mm or more,
(f) the case of welding in the state with the position of the fixed side welding electrode from a steel sheet in the pressing direction having a clearance of 0.2 mm or more, and
(g) the case of welding sheets combination including steel sheets with a strength ratio of over 2.5.

16. The method of a spot welding according to claim 13, further comprising removing the plating of the steel sheets where no cracking was confirmed at the test spot welding.

\* \* \* \* \*